(12) United States Patent
Etheridge

(10) Patent No.: US 7,188,164 B1
(45) Date of Patent: Mar. 6, 2007

(54) SECURE NETWORK ACCESS CONTROL

(75) Inventor: James K. Etheridge, Jupiter, FL (US)

(73) Assignee: Cyber Operations, LLC, Livingston, AL (US)

( * ) Notice: Subject to any disclaimer, the term of this patent is extended or adjusted under 35 U.S.C. 154(b) by 725 days.

(21) Appl. No.: 10/364,791

(22) Filed: Feb. 11, 2003

(51) Int. Cl.
G06F 15/177 (2006.01)

(52) U.S. Cl. .................. 709/221; 709/217; 709/225; 709/238

(58) Field of Classification Search .............. 709/217, 709/223–227, 221, 238, 248
See application file for complete search history.

(56) References Cited

U.S. PATENT DOCUMENTS

| | | | | |
|---|---|---|---|---|
| 5,263,157 A | * | 11/1993 | Janis | 709/217 |
| 6,243,815 B1 | * | 6/2001 | Antur et al. | 709/220 |
| 6,381,602 B1 | * | 4/2002 | Shoroff et al. | 709/217 |
| 6,553,423 B1 | * | 4/2003 | Chen | 709/238 |
| 6,651,096 B1 | * | 11/2003 | Gai et al. | 709/225 |
| 6,961,809 B2 | * | 11/2005 | Krishnan et al. | 711/108 |
| 7,016,980 B1 | * | 3/2006 | Mayer et al. | 709/248 |

OTHER PUBLICATIONS

Bellovin, Steven, "Distribution Firewalls", Nov. 1999 issue of ;login, pp. 37-39 [web access at http://www.cs.columbia.edu/!smb/papers/distfw.html on Sep. 12, 2006].*
Loannidis, Sotiris, "Implementing a Distribution Firewall", 2000, 7th ACM Conference on Copmuter and Communications Security, pp. 190-199.*

* cited by examiner

*Primary Examiner*—Ario Etienne
*Assistant Examiner*—Ramy Osman
(74) *Attorney, Agent, or Firm*—Smith, Gambrell & Russell

(57) ABSTRACT

A method and system of network access security utilizes identifying the router devices in the network path or other such router devices as may be encountered in protecting a particular portion of the inter-networked system to determine the variation in ACL format and content with each ACL format being then analyzed to determine a paradigm set of packet fields common to all identified ACL formats in which each ACL is then re-written entry by entry to form a paradigm ACL corresponding as nearly as possible to the original ACL. The paradigm ACL for each non-homogenous network device is then merged with each other paradigm ACL to create a common paradigm ACL which can be distributed to each non-homogenous router device to provide common filtering across all of the routers.

11 Claims, 2 Drawing Sheets

Router Access-List Merging and Deployment

Figure 2 – Router Access-List Merging and Deployment
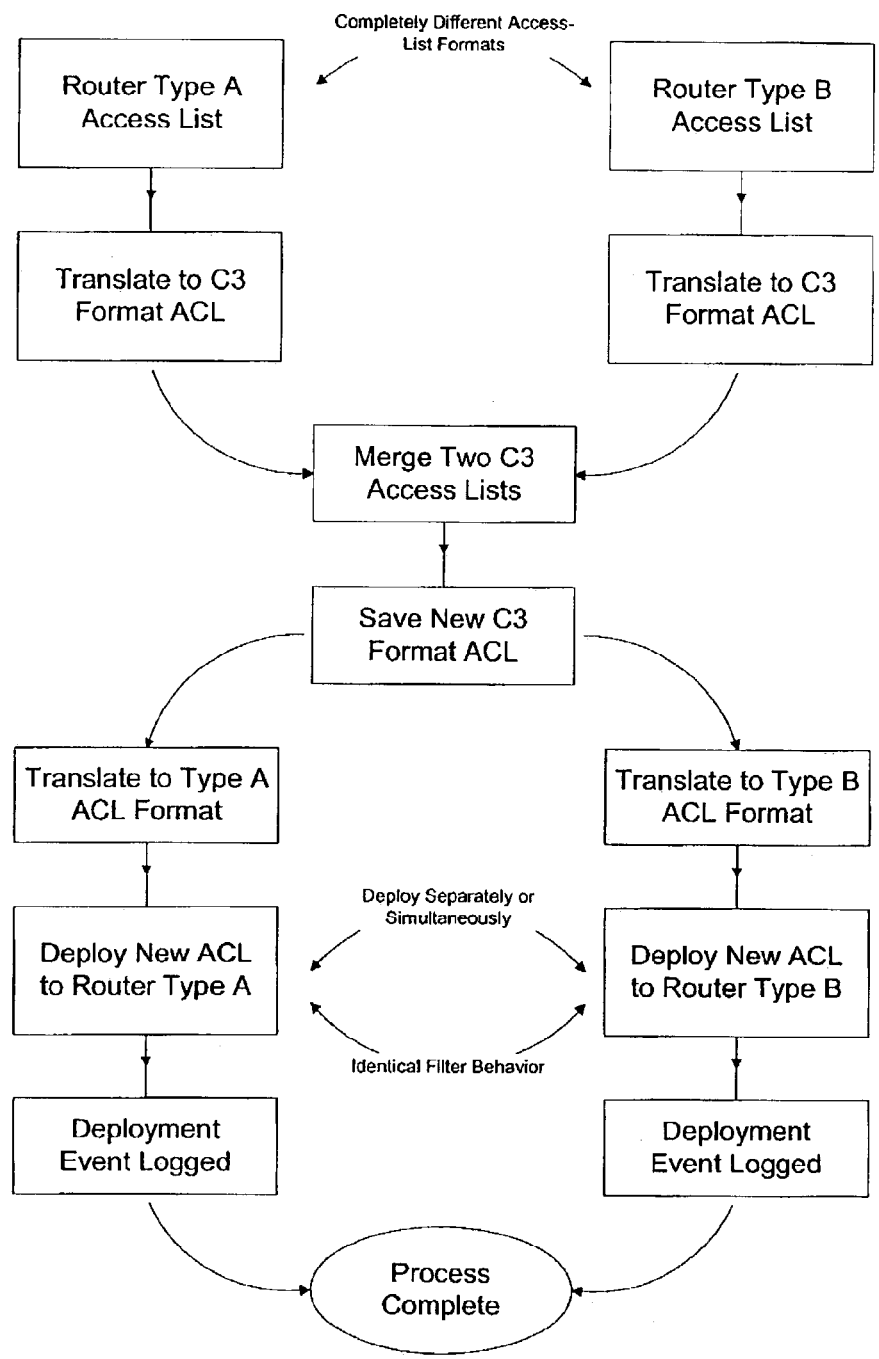

SECURE NETWORK ACCESS CONTROL

FIELD OF THE INVENTION

The present invention relates to a distributed network of computers inter-networked to provide a transfer of data or information there-between wherein at least some of the devices in the network serve to control the access to other devices in the network. More particularly the present invention relates to an inter-networked system in which a plurality of non-homogenous devices are used as routers to facilitate the flow of data and information across the system and also as access control points within the system. In even greater particularity the present invention is related to the use of filtering by components of the identification of packets of information transmitted across the inter-networked system.

BACKGROUND OF THE INVENTION

Using the inter-networked system of devices known as the Internet as an example, typical connections to the Internet are made using Internet Protocol (IP) Addresses. The IP Addresses allow communication over the Internet to be directed from a specific source to an appropriate destination. Thus, in each packet of information sent over the Internet, you typically expect to find the IP address of both sender and destination. A full IP Address consists of the actual IP address location and a Port Number. The IP Address is in the format "nnn.nnn.nnn.nnn," where n is between 0 and 255. There may be from one to three digits used between each decimal point in the address, for example 203.77.8.99.55. Most Internet users are familiar with Domain Names which are readable versions of IP address, such as "hamburger-.com" or "answerit.net". Port Numbers can be any number from 0 to 65535, with the first 1024 called "well known" Port Numbers which define specific tasks (e.g. web browsing occurs on the "well known" port number 80; file transfer protocols (FTP) use port 20 and port 21; simple mail transfer protocols (SMTP) use port 25).

The Again by example, a highly simplified breakdown of the contents of a data packet that carries a request for access to a web page from one device on the inter-networked system to a server device also on the system is presented. The packet contains various fields not all of which are discussed herein. The packet includes a beginning field universally recognizable by devices on the network as the start of a packet, and an ending field recognizable as the end of the packet. One field indicates the source of the data packet, by network address of the device sending the request. This field may contain IP and/or Media Access Control (MAC) addressing information. Necessarily, the destination address field provides the destination network address of a network device that is to receive the packet, and may also contain IP and/or MAC layer addressing information. Also included in the packet is a data field used to transport the data or payload of the packet from the browser software on the requesting device to the web server software operating on the receiving device.

Typically the requesting device and the receiving device on the inter-networked system will be separated by one or more network devices known as routers, which function, to facilitate the communications on the internet or to control access to various portions of the inter-networked system or to a proprietary Local Access Network connected to the internet. Due to the constantly growing size of the Internet and the need to control access, there will typically be several routers between devices. In particular systems to perform access control, packet information is compared against database information available to the router device using an application programming interface that allows the router device to compare any selected packet field, such as addresses and port information in all packets intended to pass through the router. The router device 100 can also detect TCP socket and/or session numbers or other unique identifiers within TCP/IP. The selection and ordering of unique identifiers used in comparison of packets to the database is not uniform in routers on the network, in as much as various manufacturers use different strategies and different formats to create the control interfaces. Thus, the router devices are considered to be non-homogenous.

Router devices typically include a plurality of interfaces which define how the router controls the flow of packets at or sent from the respective interface. The interfaces typically use an Access Control List ("ACL"). The formatting and selection of the fields or parameters for use in each entry in the ACL is again not uniform in the router devices due to variations in manufacturer. ACLs filter packets and can prevent certain packets from entering or exiting a network or portion of a network. Essentially, each ACL is a list of information that a router device may use to determine whether packets arriving at or sent from a particular interface may be communicated across the router. For example, the ACL may comprise a list of IP addresses and types of allowable protocols for that IP address. In another example, the ACL may comprise a list of IP addresses and port identifiers. In either example a specific entry in the ACL may control permission or denial of communication based on one or more fields in a packet. The specific format of any particular ACL used in any router device may be ascertained from the manufacturer's data sheets or other information, however, the present invention is needed because of the non-homogenous nature of the infrastructure of the inter-networked system. That is to say, currently a router from one manufacturer may have an ACL which utilizes a number of fields to selectively filter packets, while another router from a different manufacturer will have an ACL in a different format utilizing a different set of fields to selectively filter packets. In the environment present today an organization will likely have diverse locations on the inter-networked system using non-homogenous routers, thus there will not be an organizationally uniform ACL filtering due to the non-homogenous nature of the infrastructure. In certain situations, access control across an organization needs to be uniform to insure that each part of the organization is secure from outside intervention or attack by unauthorized entities. Accordingly, a need exists to provide uniform access security across non-homogenous networks.

SUMMARY OF THE INVENTION

It is the object of the present invention to facilitate common access security across an inter-networked system of non-homogenous network devices.

Yet another object of the invention is to provide enhanced security against identified threats to network security.

Still another object of the invention is to provide a common access control list for use on non-homogenous access control devices.

These and other objects and advantages of the invention are accomplished using the same architecture as described in the co-pending application for entitled "System and Method for Anti Network Terrorism" in United States Patent Application 20020166063, published Nov. 7, 2002, owned by the common assignee herewith, which is incorporated herein by reference. It is an object of the present invention to enhance the ability of the invention described therein to thwart anti-network terrorism. The present invention is enabled by identifying the router devices in the network path such as a gateway to a LAN or other such router devices as may be encountered in protecting a particular portion of the inter-networked system. Each identified router device can be compared to each other router device in the system to determine the variation in ACL format and content to determine the number of non-homogenous formats in use in the system. Each ACL format is then analyzed to determine which discrete packet fields are used for filtering and a paradigm set of packet fields which are common to all identified ACL formats is created. Each ACL from each non-homogenous network device is then re-written entry by entry to form a paradigm ACL corresponding as nearly as possible to the original ACL. The paradigm ACL for each non-homogenous network device is then merged with each other paradigm ACL to create a common paradigm ACL which can be distributed to each non-homogenous router device to provide common filtering across all of the routers.

BRIEF DESCRIPTION OF THE DRAWINGS

The methodology of the present invention is depicted in the accompanying drawings which form a portion of this disclosure and wherein.

DESCRIPTION OF THE PREFERRED EMBODIMENTS

Figure 1:
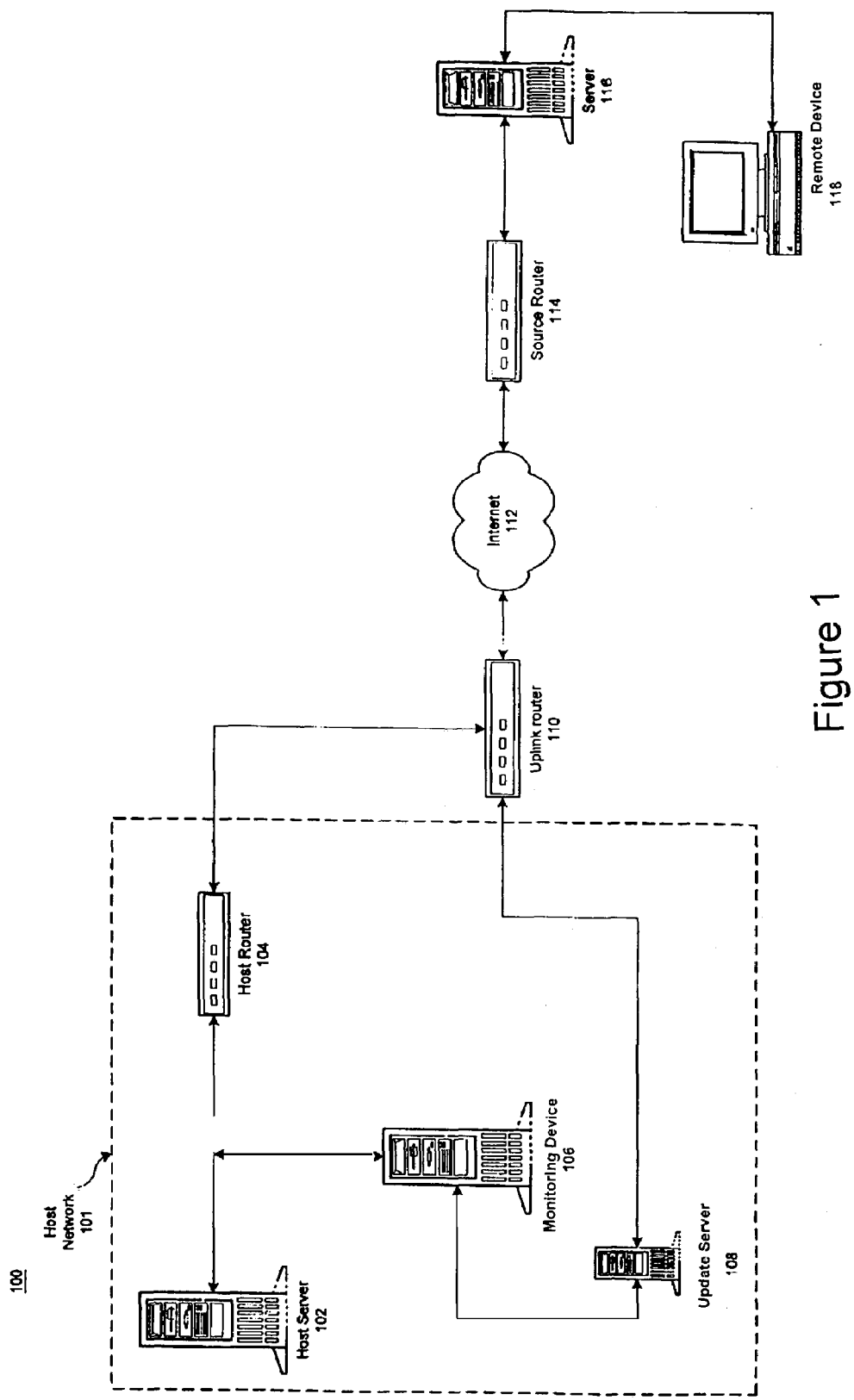
FIG. 1 is a is a depiction of the interconnected network of computers in which the present invention is utilized; and, FIG. 2 is a flow chart of the method of utilization of the present invention.

The present invention is intended for use in environments where multiple routers are used to facilitate and control the flow of digital traffic across a computer network. The Internet is the most well known of such inter-networked systems, thus the discussion herein is directed to the Internet or subsets of the Internet, but is applicable to any router device enabled network. Referring to the figures for a clearer understanding of the invention, note that FIG. 1 depicts a host network node 101 having at least one host server 102 on which files are accessible via the Internet 112. To access the files on host server 102 or for host server to download files to Internet 112 the digital communications line passes through host router 104 and uplink router 110. In the embodiment shown, a passive monitoring system 108, such as one described in application No. 20020166063 is deployed, and communicates via an update server 108 to uplink router 110. By way of illustration, consider that an entity may have multiple host network nodes 101 with multiple uplink routers 110 and the uplink routers are likely connected to additional routers which may be gateway routers or facilitating routers. In any event, each router has at least one input interface and one output interface with each interface having an ACL. In accordance with the background of the invention, host router 104 may be made by a different manufacturer than uplink router 110 and thus be non-homogenous in terms of filtering of digital transmissions as well as ACL strategy. Likewise, from node to node the uplink routers 110 operated by an entity may be non-homogenous. In this embodiment, it is to be assumed that monitoring system 106 and update server 108 are robust systems which are able to rapidly process commands such that they are able to respond to a need to update an instruction to uplink router 110 and to other routers in the system.

For simplicity of illustration, assume that routers are manufactured by only entities A and B, although additional entity manufactured routers may be treated in the same manner. Further assume that all A routers have the same ACL strategy which is different from the ACL strategy commonly used in B routers. Further, any router in the system may be either an A router or a B router. When monitoring system 106 detects that a change is needed in the filtering of digital traffic to the node or network, it needs to be able to output the changes to the appropriate ACL for each router in the network. Under practices known to the inventors, such an update can take several days to several months to facilitate. Further, if two routers are using different ACL's even in a homogenous system, it may take several days to create a common ACL from the two different ACLs. The present system can merge two ACLs containing several thousand entries in a matter of seconds.

For the most simple case, assume that all the routers in the host network are A routers and a homogenous system exists in the host network. In this case, a given subset of all the available fields is chosen for use as a paradigm subset for filtering purposes. In actuality, the set of packet fields used in A routers and B routers is compared and a common subset of packet fields is chosen as the paradigm subset. This selection may be accomplished electronically by identifying the packets used in A routers and B routers by parsing the packets electronically, or may be done manually by reference to the fields known in the industry to be used in the router types. As noted above, and by way of example, some routers may filter by "protocol" while others may filter by "port number" however, a sufficiently accurate correlation between protocols and port numbers can be determined from practice on the Internet to allow the paradigm subset to satisfy a large proportion of the needs of any filtering strategy for a manufacturer. Thus it is to be understood that as nearly as possible, the Arouter set of fields will be matched with corollaries in the paradigm set of fields and so will the Brouter set of fields, even though such changes may result in filtering by technically different fields as noted with the port number and protocol example. In the paradigm subset, the filter fields are preferably: source IP address; source mask; source port start number; source port finish number; destination IP address; destination mask; destination Port Start number; and, destination Port finish number. Referring to FIG. 1, the fields identified as source fields would be the fields associated with remote device 118, server 116, or source router 114, if those fields were changed as the packet passed from one to the other. Eg. if Router 114 changed all of the source IP addresses for all packets passing through it to an IP address associated with router 114, then that would be seen as the source Ipaddress in the field rather than the source IP address of the server 116.

Accordingly, the paradigm ACL entries will be in the format similar to the following:
'Permit IP out from 157.128.0.0 to any address'
'Permit IP out from 193.211.9.88 to 157.128.0.0'
'Deny IP in from 203.66.01.3/25'
. . .

An ACL may contain a few entries to several thousand entries, thus in merging the entries from a plurality of ACL's each entry in each ACL must be compared to each entry in each merging ACL. It should be understood by those skilled in the art that either an implicit permit or deny entry will always exist in the interface, thus after the specific entries from the ACL's have been compared without a match, there will always be a match or intersection between the general implicit entry and a specific entry. Accordingly, if the fields in an entry from both ACL's match then a set of rules must determine how the merged ACL entry will read. In the present invention, in the paradigm subset it is preferable to first attempt to match the most likely fields, for if these do not match then the pair of entries under comparison do not match. In the paradigm subset, the most likely matches would be the IP addresses and the mask of the entries. Consequently, to speed the process of comparing each entry in an ACL use a Boolean intersection tool to make the comparison. By way of example one can use the IP address and mask to do an initial comparison since these are most likely to not yield an intersection thus the entries do not match an no further comparison need be done between those two entires. However, if an intersection is defined by the IPaddress and mask fields then the port fields must also be checked for completion of the total intersection. Again this requires comparison of each entry of each ACL to be merged with each other entry, a process which can be expressed as: For ACL1 and ACL2 the merger yields, the iterative comparison $\Sigma_i \Sigma_j$ ACL1$_i$ ∩ACL2$_j$, and appending the result of each intersection resulting as an output written to the Common ACL, where the permit access or deny access is based on input rules and user preferences.

The options for the output are: i) ACL instructions that permit in one list but deny in the other list become denied in the Common Paradigm ACL; ii) ACL instructions that permit in one list but deny in the other list become permitted in the Common Paradigm ACL; iii) More specific entries take precedence over broader entries; or iv) Use manual confirmation to resolve conflicts. Option iii. would take precedence over options i. or ii. such that:

ACL1: "permit IP out from any address to any address"
ACL2: "deny IP out from 157.128.0.0/11 to 17.52.0.0/19"
Becomes
ACLP: "deny IP out from 157.128.0.0/11 to 17.52.0.0/19"

In the most common case, the network includes Arouters and Brouters in which the ACL's are written using the non-paradigm subset fields, thus, before merger to create a Paradigm ACL, each entry must be translated to the Paradigm subset format. Thus, each entry is parsed into fields, the fields in the Arouter ACL entries are compared to the fields used in the Paradigm subset format and corresponding fields in the paradigm subset are written into a Paradigm entry for inclusion in an Aparadigm ACL. Likewise the Brouter ACL entries are compared to the fields used in the Paradigm subset format, and corresponding fields in the paradigm subset are written into a paradigm entry for inclusion in a Bparadigm ACL. When the ACL's have been compiled then they are merged in the same manner as described above to create a Common Paradigm ACL. The Common Paradigm ACL, containing all the entries is then converted to Arouter subset format and Brouter subset format by rewriting each entry in the Paradigm ACL using the corresponding fields in the router subset and format. Thus, all of the routers in the network will have the same functional filtering capabilities as reflected in the Common Paradigm ACL.

The ability to rapidly merge ACL's in the paradigm field subset provides a significant advance in network access security which, along with the measures discussed in US Patent Application 20020166063 provides a significant obstacle to network terrorism. While, the foregoing discussion has been limited to specific examples, it is to be understood that the filtering can be performed using any identifiable fields and the programming of the router systems referred to may be accomplished in any appropriate language.

I claim:

1. A method for integrating non-homogenous intermediate devices to create common filtering across selected intermediate devices in a communications network having a plurality of computers interconnected therein, including at least two intermediate devices for routing electronic communication between other computers, wherein each of said at least two intermediate devices have an access control list contained in a file in memory available to said intermediate device which are used by said intermediate devices to filter said electronic communications, each said access control list having a format and a plurality of filtering parameters, comprising the steps of:
   a) Identifying the filter parameters of each access control list of non-homogenous devices included in said selected intermediate devices;
   b) Identifying common filter parameters which are common to all of the access control lists associated with the selected intermediate devices;
   c) Generating paradigm access control lists for each selected intermediate device using said common filter parameters in a format including said common filter parameters;
   d) Using said Paradigm Access Control parameters to create a common paradigm access control list for all selected intermediate devices from one or more paradigm access control lists from one or more non-homogeneous intermediate devices.

2. A method as defined in claim 1 wherein said filter parameters are contained in digital packets received at said intermediate device.

3. A method as defined in claim 1 wherein said using step comprises merging two or more paradigm access control lists to yield a common paradigm access control list for use in integrated intermediate devices.

4. The method of claim 3 further comprising converting said common paradigm access control list to a format used in access control lists of each non-homogenous device.

5. The method of claim 4 further comprising distributing said converted common paradigm access control lists to each intermediate device.

6. The method of claim 3 wherein each paradigm access control list comprises a plurality of discrete entries containing paradigm control access parameters and one or more action instruction relative to said entry, said merging step comprises iteratively comparing each entry in each paradigm access control list with each entry in each other paradigm access control list to be merged therewith to determine whether any entries contain an identity of paradigm access control parameters and for any pair of entries containing an identity of paradigm access control parameters, comparing the action instruction for said entries to determine a logical action instruction of a resultant entry to replace said pair of entries in a common paradigm access control list.

7. The method of claim 6 wherein said common paradigm control list comprises all resultant entries iteratively determined by comparing said entries.

8. The method of claim 6 wherein said comparison of entries comprises parsing each entry into a set of fields corresponding to said parameters and iteratively comparing said entries on a field by field basis.

9. The method of claim 8 wherein the fields include a source IP address, a source mask, a destination IP address and a destination mask, which are compared in each entry of the paradigm access control lists, such that lack of intersection in these fields ends further comparison and results in neither entry being in the common paradigm ACL from that comparison.

10. The method of claim 9 wherein entries which have intersecting filtering fields are compared for action compatibility such that only one entry with said filtering fields will be included in a common paradigm ACL in accordance with a predetermined action ordering rule.

11. A method for uniform filtering of electronic communications across a distributed electronics communications network having a plurality of computers interconnected by a plurality of routers, each router having an access control list defined by a predetermined format and a plurality of parameters defining action instructions for the router relative to electronic communications received by the router, comprising a) for each router in the network, determining the format of its access control list, b) for each router in the network determining all the parameters in its access control list, c) determining which of the determined parameters are common to all the routers in the network;

d) generating a paradigm access control list for each router using the parameters determined to be common to all routers;

e) merging all generated paradigm access control lists to produce a common access control list for all routers; and, f) distributing said common access control list to all routers.

* * * * *